United States Patent [19]

Miyazaki et al.

[11] Patent Number: 5,159,221

[45] Date of Patent: Oct. 27, 1992

[54] BRUSH HOLDER STRUCTURE IN ELECTRIC MOTOR

[75] Inventors: Masami Miyazaki, Maebashi; Isao Abe, Ashikaga, both of Japan

[73] Assignee: Mitsuba Electric Manufacturing Co., Ltd., Gunma, Japan

[21] Appl. No.: 575,831

[22] Filed: Aug. 31, 1990

[30] Foreign Application Priority Data

Aug. 31, 1989 [JP]  Japan ................. 1-225262

[51] Int. Cl.⁵ ........................................... H02K 13/00
[52] U.S. Cl. ...................................... 310/239; 310/43; 310/83; 310/89; 310/242; 310/245
[58] Field of Search .............. 310/83, 239, 242, 245, 310/247, 249, 89, 43

[56] References Cited

U.S. PATENT DOCUMENTS

| | | | |
|---|---|---|---|
| 3,908,142 | 9/1975 | Gaudry | 310/242 |
| 4,074,162 | 2/1978 | Parzych | 310/245 |
| 4,118,647 | 10/1978 | Brenner et al. | 310/239 |
| 4,227,104 | 10/1980 | Hamman | 310/83 UX |
| 4,355,253 | 10/1982 | Vollbrecht | 310/239 |
| 4,475,053 | 10/1984 | Mayer | 310/239 |
| 4,554,476 | 11/1985 | Gotoh | 310/239 |
| 4,677,333 | 6/1987 | Auzolat et al. | 310/239 |
| 4,748,358 | 5/1988 | Okashiro | 310/43 |
| 4,801,833 | 1/1989 | Dye | 310/239 |
| 4,847,528 | 7/1989 | Eguchi | 310/239 |
| 4,885,948 | 12/1989 | Thrasher et al. | 310/83 |
| 5,015,897 | 5/1991 | Inagaki et al. | 310/83 |

FOREIGN PATENT DOCUMENTS 61-138361  8/1986  Japan .
61-266048 11/1986  Japan .

*Primary Examiner*—R. Skudy
*Attorney, Agent, or Firm*—Oliff & Berridge

[57] ABSTRACT

A brush holder structure in an electric motor in which brush holders for housing brushes held in slidable contact with a commutator provided on a rotor shaft and an end bracket for rotatably supporting the rotor shaft are both integrally molded with a gear frame for housing and supporting a worm gear mechanism. The worm gear mechanism includes a worm formed around the distal end portion of the rotor shaft and a worm wheel held in mesh with the worm. A lead-out groove for leading out a pig tail extended from each brush is formed in a proximal end side wall of each brush holder with respect to the rotor shaft, and a receiver for receiving resilient spring fitted in each brush holder to press each brush against a commutator is disposed between two proxiamal and distal end side walls of each brush holder. The receiver extends in the axial direction of the rotor shaft, and is set to have its width not exceeding the width of the lead-out groove in the circumferential direction of the rotor shaft. The brush holders having the receiver can be simply molded by setting first and second molds in butt relationship against a main mold.

3 Claims, 6 Drawing Sheets

BRUSH HOLDER STRUCTURE IN ELECTRIC MOTOR

BACKGROUND OF THE INVENTION

The present invention relates to a brush holder structure in an electric motor for use as a component of electric equipment or the like and a mold structure for manufacturing brush holders.

Generally, in some electric motors of this type, brush holders for housing brushes held in slidable contact with a commutator provided on a rotor shaft and an end bracket for rotatably supporting the rotor shaft are both integrally molded with a gear frame for housing and supporting a worm gear mechanism. The worm gear mechanism comprises a worm formed around the distal end portion of the rotor shaft and a worm wheel held in mesh with the worm. When such a gear frame is molded, a mold for forming the brush holders is required to have a pair of first molds set in butt relationship along the axis of the rotor shaft for forming at least the outer surfaces of the proximal end side walls of the brush holders with respect to the rotor shaft and the end faces of the brush holders on the side where the brushes are projecting from the brush holders, and a pair of second molds set in butt relationship from the outer peripheral side toward the axis of the rotor shaft for forming the inner surfaces of four surrounding walls of each brush holder.

In the conventional mold, however, since the second molds are set in butt relationship from the outer peripheral side toward the axis of the rotor shaft, the brush holder is made hollow throughout from the inner peripheral end, through which the associated brush projects, to the outer peripheral end thereof. As a result, resilient means for resiliently pressing the brush is arranged in the form of torsion resilient means attached to a resilient means attachment which is provided on the outside of the brush holder, and a free end of the resilient means is pressed against the rear surface (the end face on the outer peripheral side) of the brush for resiliently holding the brush in slidable contact against a commutator. Meanwhile, there is a strong demand for reduction in weight and size of electric motors as well. To meet this demand, the end bracket also needs to be designed more compactly. This makes it difficult to ensure a space in the end bracket for the resilient means attachment on the outside of the brush holder. Therefore, the brush holder is required to be designed so that the resilient means for pressing the brush is fitted in the brush holder.

SUMMARY OF THE INVENTION

In one aspect, the present invention relates to a brush holder suitable for use in an electric motor having a commutator mounted on a rotor shaft, comprising a gear frame for housing a worm gear mechanism and integrally molded with both
  i) a plurality of brush holders, each adapted to house a brush held in slidable contact with said commutator, and
  ii) an end bracket for rotably supporting said rotor shaft.

In another aspect, the present invention relates to a mold suitable for manufacturing brush holders for electric motors in which a gear frame housing is integrally molded with both an end bracket and brush holders for brushes in slidable contact with a commutator mounted on a rotor shaft, comprising
  i) a pair of first molds adapted to be arranged in butt relationship along an axis of said rotor shaft and adapted to form at least an outer surface of proximal end side walls of said brush holders with respect to said rotor shaft, and the end faces of said brush holders on the side where said brushes project from said brush holders,
  ii) a pair of second molds adapted to be arranged in butt relationship from the outer peripheral side toward the axis of said rotor shaft for forming at least inner surfaces of four surrounding walls of each of said brush holders.

BRIEF DESCRIPTION OF THE DRAWINGS

The drawings illustrate one embodiment of a brush holder structure in an electric motor and a mold structure for manufacturing brush holders according to the present invention, in which.

Figure 1:
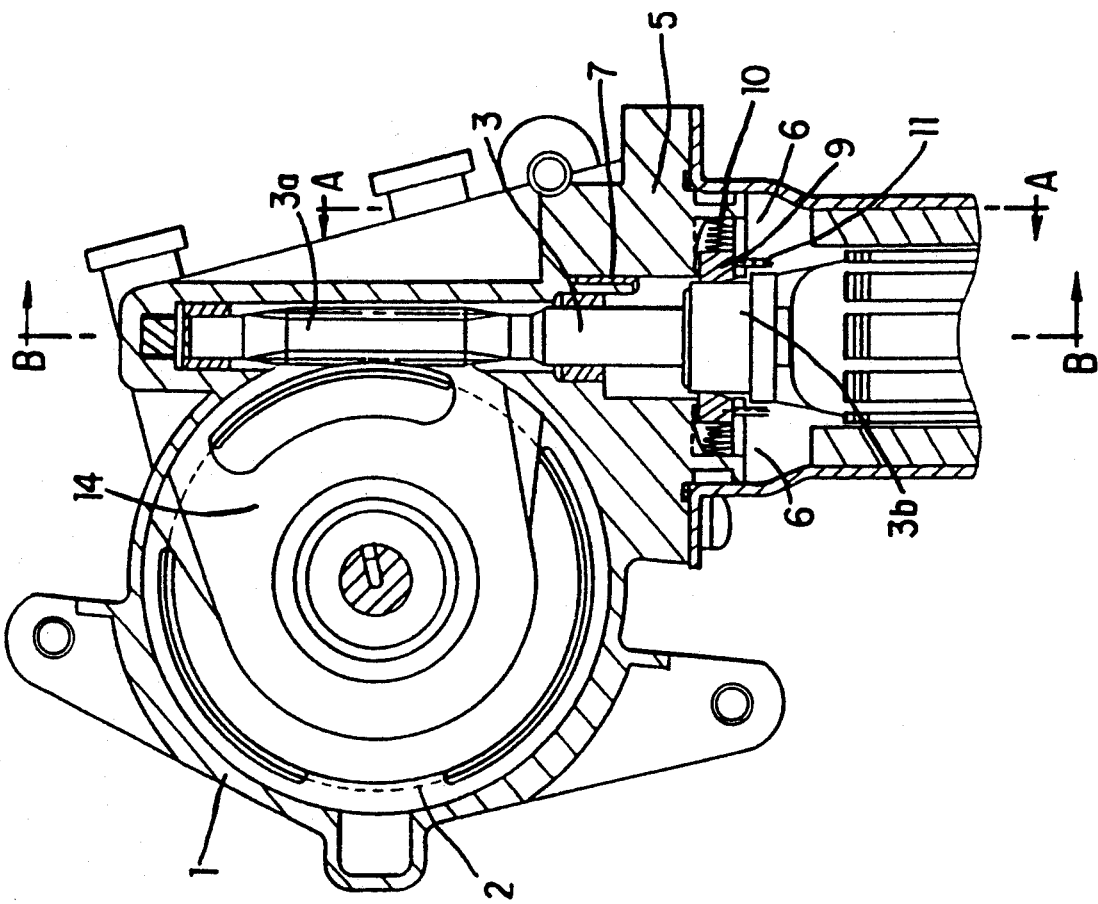
FIG. 1 is a front sectional view of a gear frame.
Figure 2:
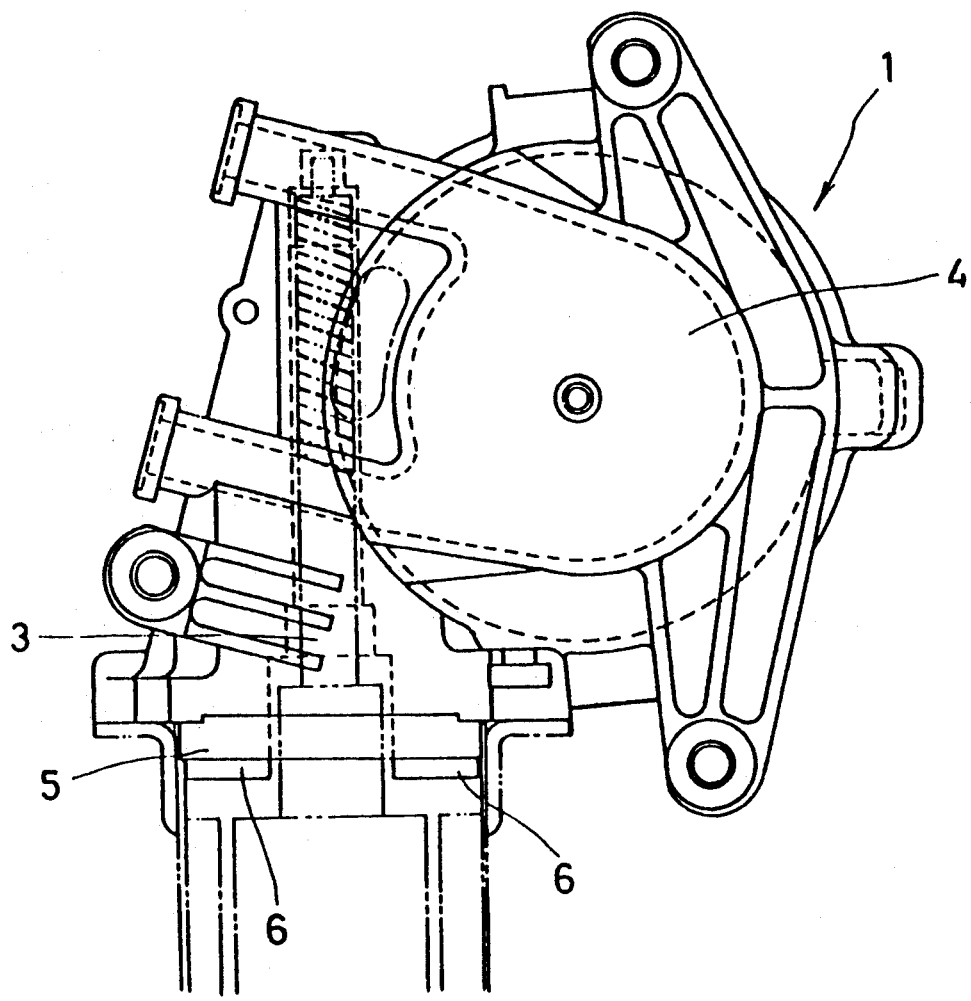
FIG. 2 is a rear view of the gear frame.
Figure 3:
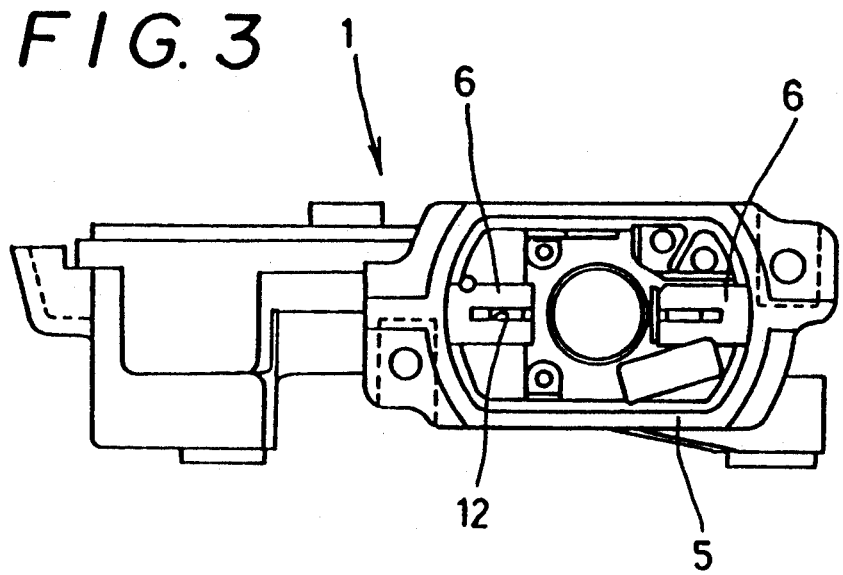
FIG. 3 is a bottom view of the gear frame.

DETAILED DESCRIPTION OF A PREFERRED EMBODIMENT:

In view of the state of the prior art, the present invention has been achieved for the purpose of providing a brush holder structure in an electric motor and a mold structure for manufacturing brush holders, which can eliminate the above-mentioned disadvantages. As a brush holder structure in an electric motor in which brush holders for housing brushes held in slidable contact with a commutator provided on a rotor shaft and end bracket for rotatably supporting the rotor shaft are both integrally molded with a gear frame for housing and supporting a worm gear mechanism which comprises a worm formed around the distal end portion of the rotor shaft and a worm wheel held in mesh relationship with the worm, a lead-out groove for leading out therethrough a pig tail extended from each brush is formed in a proximal end side wall of each brush holder with respect to the rotor shaft, and a receiver means for receiving resilient means fitted in each brush holder to press each brush against a commutator is disposed between two proximal and distal end side walls of each brush holder with respect to the rotor shaft so as to extend in the axial direction of the rotor shaft, and is set to have its width not exceeding the width of the lead-out groove in the circumferential direction of the rotor shaft.

A mold structure for manufacturing brush holders in an electric motor in which brush holders for housing brushes held in slidable contact with a commutator provided on a rotor shaft and an end bracket for rotatably supporting the rotor shaft are both integrally molded with a gear frame for housing and supporting a worm gear mechanism which comprises a worm formed around the distal end portion of the rotor shaft and a worm wheel held in mesh relationship with the worm, comprises a pair of first molds set in butt relationship along the axis of the rotor shaft for forming at least the outer surfaces of the proximal end side walls of the brush holders with respect to the rotor shaft and the end faces of the brush holders on the side where the brushes are projecting from the brush holders, and a pair of second molds set in butt relationship from the outer peripheral side toward the axis of the rotor shaft for forming the inner surfaces of four surrounding walls of each brush holder, the first molds being each provided with a lead-out groove forming mold piece for defining a lead-out groove for a pig tail extended from each brush in the proximal end side wall with respect to the rotor shaft in such a manner as to extend long enough to reach the inner surface of the distal end side wall with respect to the rotor shaft and define the corresponding portion of the same inner surface, the second molds being each formed with a mold groove so as to avoid an interference with the lead-out groove forming mold piece with the groove bottom surface of the mold groove positioned deeper than the position corresponding to the groove bottom of the lead-out groove, whereby a resin material filling portion is formed between the groove bottom surface of the mold groove and the surface of the mold piece corresponding to the groove bottom of the lead-out groove so that a receiving means for receiving resilient means adapted to resiliently press the brush fitted in each brush holder is formed between the proximal and distal end side walls with respect to the rotor shaft.

With the above arrangement of the present invention, the resilient means can be incorporated in the brush holders and still allow integral molding of the end bracket and the brush holders with the gear frame.

Hereinafter, one embodiment of the present invention will be described with reference to the drawings.

In the drawings, designated by reference numeral 1 is a gear frame of a motor assembly for power windows. The gear frame 1 comprises a frame body section 4 which houses and supports therein a worm gear mechanism having a worm 3a formed around the distal end portion of a rotor shaft 3 and held in mesh relationship with a worm wheel 2, and an end bracket section 5 in which a yoke incorporating a rotor core is fitted, the frame body section 4 and the end bracket section 5 being integrally formed by molding. A pair of brush holders 6 are formed in the end bracket section 5 in opposite relationship radially of the rotor shaft 3. Further, requisite insert members such as terminals 7, 8 are assembled in the end bracket section 5, while brushes 9 and resilient means (springs) 10 are accommodated in the brush holders 6, respectively, with pig tails 11 extended from the brushes 9 for electrical connection of the above members. Note that 3b is a commutator against which the brushes 9 are pressed and held in slidable contact.

Figure 4:
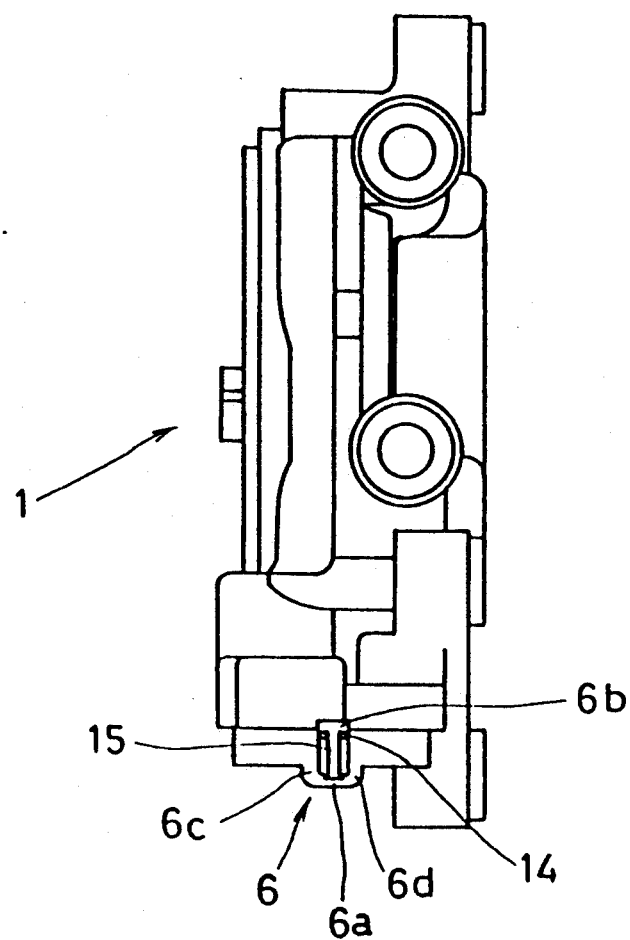
FIG. 4 is a right-hand side view, a section view taken along the A—A line in FIG. 1 of the gear frame.
Figure 5:
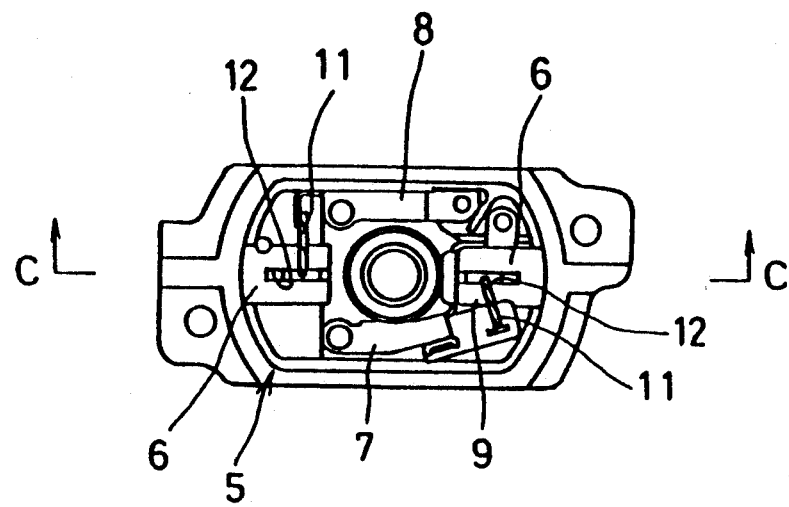
FIG. 5 is a front view of an end bracket section with an insert member assembled in place.
Figure 6:
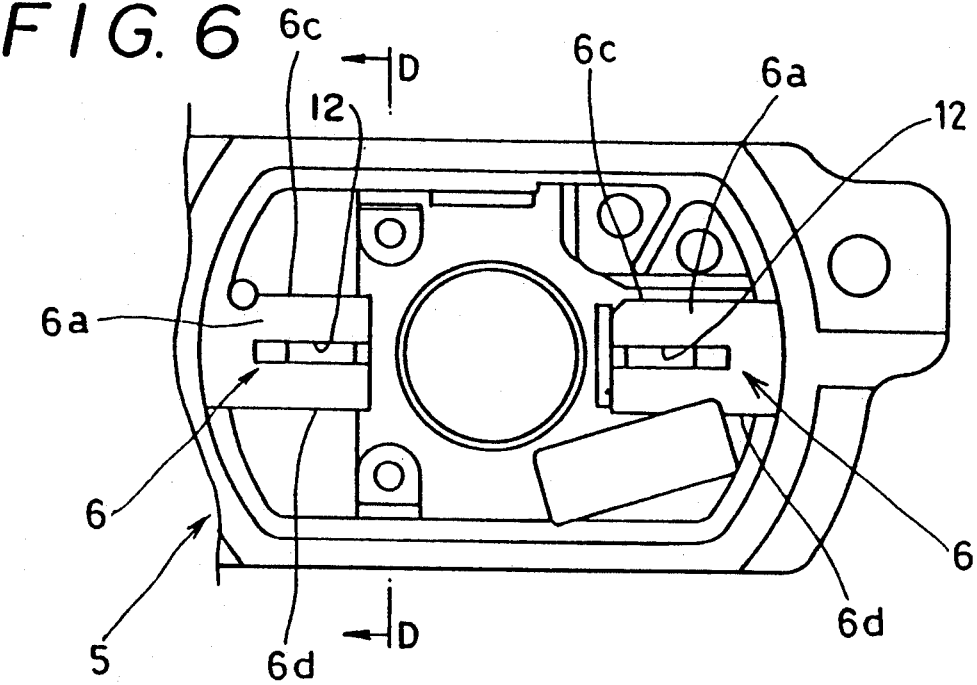
FIG. 6 is a enlarged view of the end bracket section.
Figure 7:
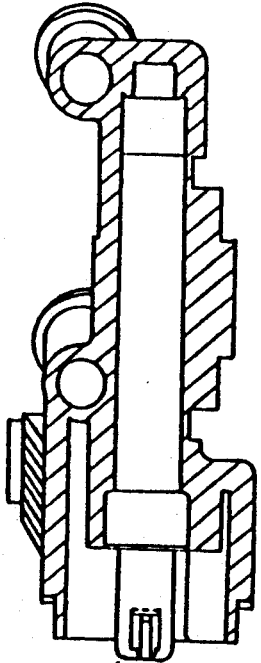
FIG. 7 is a sectional view taken along the B—B line in FIG. 1.

Referring particularly to FIGS. 4–6, the brush holders 6 are each formed by a proximal end side wall 6a and a distal end side wall 6b with respect to the rotor shaft 3, and a pair of left- and right-hand side walls 6c, 6d spaced in the circumferential direction thereof. The proximal end side wall 6a is formed with a lead-out groove 12 through which the pig tail 11 is led out. The distal end side wall 6b is formed, at its edge on the same side as where the brush is projecting, with a stepped engagement portion 14 adapted to engage and hold the brush 9 assembled in the brush holder 6. On the outer peripheral portion of the brush holder 6, there is formed a spring receiver 15 for the receiving the spring 10. The spring receiver 15 and the lead-out groove 12 are set to meet the relationship below. Thus, the lead-out groove 12 is formed in the proximal end side wall 6a such that it is opened on the same side as where the brush is projecting (i.e., the side closer to the rotor axis), and has the groove bottom on the outer peripheral side. In contrast, the spring receiver 15 is disposed between the proximal end side wall 6a and the distal end side wall 6b in an elongate shape to extend in the axial direction of the rotor shaft 3, and is spaced from both the side walls 6c, 6d. Then, the spring receiver 15 is set to have its width equal to or less than the width of the lead-out groove 12 in the circumferential direction of the rotor shaft. Persons skilled in the art will appreciate that the subject figures may not be drawn to like scales.

Figure 10:
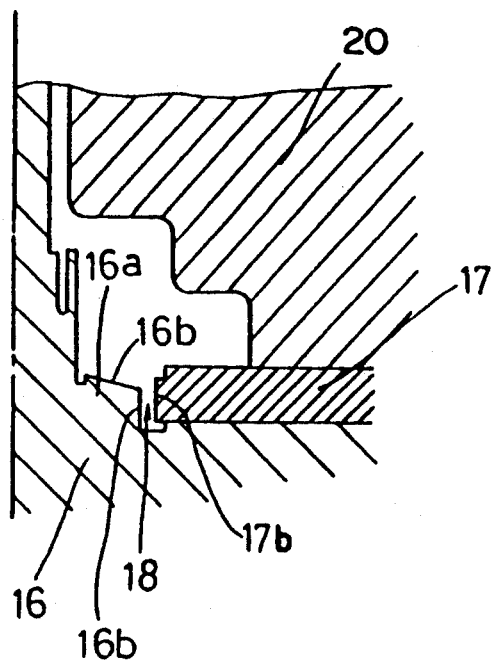
FIGS. 10X, 10Y and FIGS. 11X, 11Y are sectional views each showing mold members set in a butt relationship.
Figure 10:
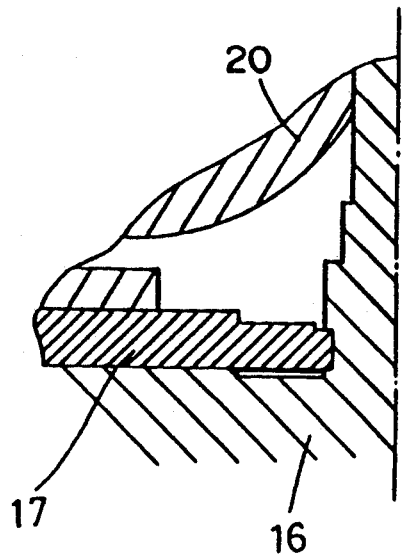
Figure 11X:
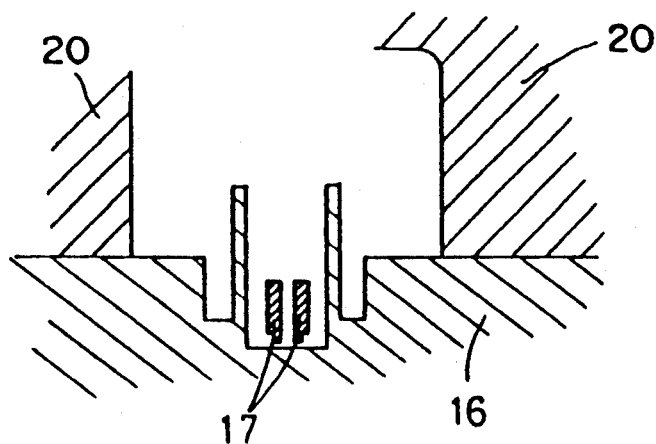
Figure 11Y:
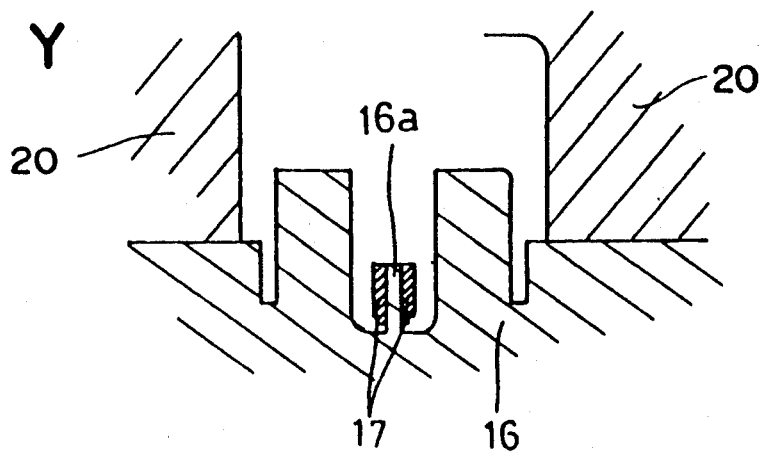

The brush holder 6 thus arranged is formed by molding as follows. Referring to FIG. 10X and 10Y, the gear frame 1 of FIG. 1 is integrally molded by setting a pair of main molds 20 in butt relationship from the front and rear of the frame body section 4 of FIG. 1, setting other later-described molds adapted to form respective portions in butt relationship, and filling a resin material into a cavity defined by the molds. Specifically in FIGS. 10X and 10Y, there are employed a pair of first molds 16,16 set in butt relationship along the axis of the rotor shaft 3 of FIG. 1, and a pair of second molds 17, 17 (shown partially inserted in FIG. 10X and fully inserted in FIG. 10Y) set from the outer peripheral side toward the center axis of the rotor shaft 3 into butt relationship. The second molds, 17, 17, correspond to the aforesaid pair of brush holder 6 of FIG. 1, respectively. The first mold 16 is formed to have its molding surfaces defining the outer surface of the proximal end side wall 6a of brush holder 6, the outer surfaces of the left- and right-hand side walls 6c, 6d, the end face on the same side as where the brush 9 is projecting, as well as the opposite end face for the brush holder 6. The second mold 17 is formed to have its molding surfaces defining the inner surfaces of the four surrounding side surfaces of the brush holder 6. The first mold 16 is also provided with a mold piece 16a of FIGS. 10X and 11Y for defining the lead-out groove 12 (FIG. 6) for the pig tail in the proximal end side wall 6a. The mold piece 16a projects sufficiently in length so as to form that portion of the inner surface of the distal end side wall 6b which corresponds to the lead-out groove 12 (FIG. 6). Furthermore, the second mold 17 is formed with a mold groove 17a (FIG. 12) so that it may be set to sandwich the mold piece 16a (see FIG. 11Y) from both the sides thereof while avoiding an interference with the mold piece 16a. The mold groove 17a has its groove bottom surface 17b positioned deeper than the surface 16b of the mold piece 16a which corresponds to or defines the groove bottom surface of the lead-out groove 12 (FIG. 6). Then, between the groove bottom surface 17b and the groove bottom corresponding surface 16b, there is defined a resin material filling portion 18 of FIGS. 10X and 12 for forming the spring receiver 15.

Figure 8:
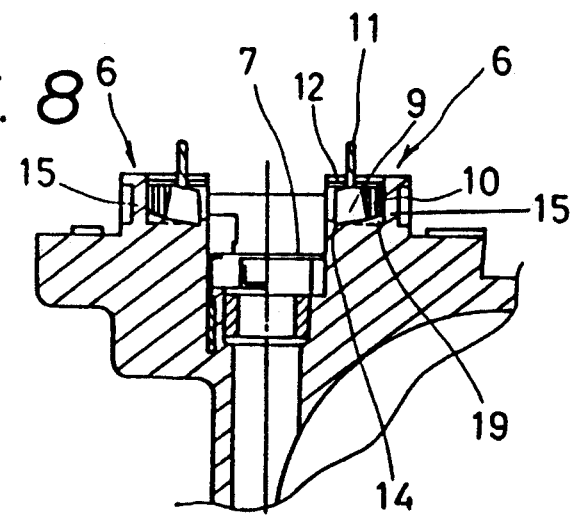
FIG. 8 is a sectional view taken along the C—C line in FIG. 5.
Figure 9:
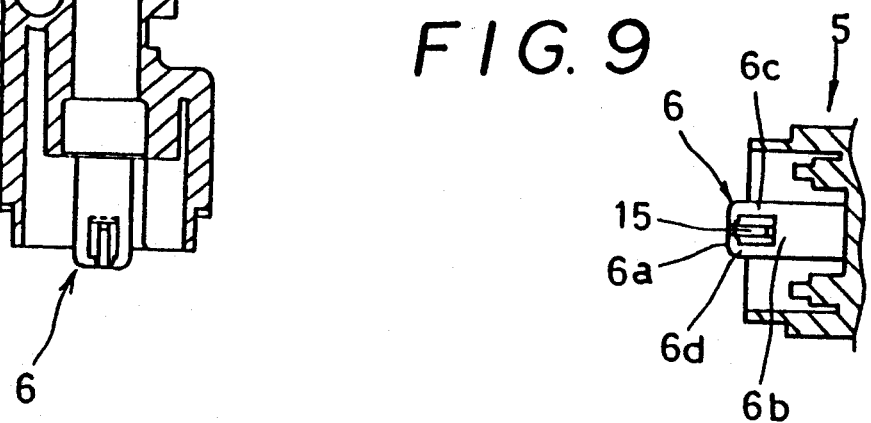
FIG. 9 is a sectional view taken along the D—D line in FIG. 6.
Figure 12:
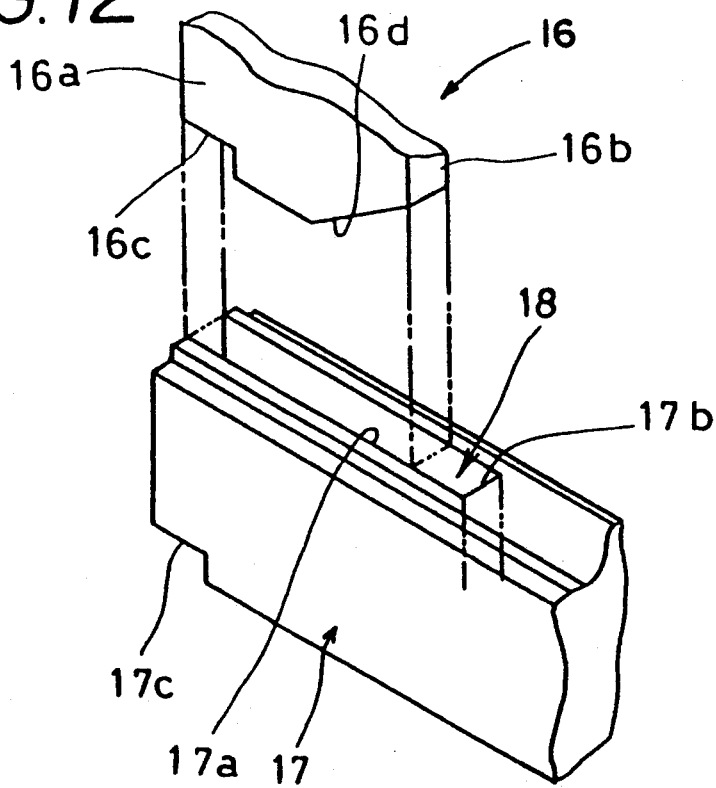
FIG. 12 is a schematic perspective view showing respective brush holder forming sections of first and second mold members.

In addition, the following consider paid in the present invention. As explained above, the brush holder 6 is formed with stepped engagement portion 14 for engaging and holding the brush assembled in place. To form the stepped engagement portion 14, stepped cutout portions 16c, 17c of FIG. 12 are formed at the distal ends of the mold piece 16a of the first mold and the second mold 17. As shown in FIG. 12, a tapered portion 16d is also formed at the distal end of the mold piece 16a to provide a restriction portion 19 (see FIG. 8) for restricting an offset or shift of the spring 10 fitted in place. See FIG. 10X.

Moreover, at the butt portion between the first mold 16 and the second mold 17, the first mold 16 is partially recessed and the distal end of the second mold 17 enters the recess of the first mold 16, as shown in FIG. 10X. A resin material is poured for molding with the first and second molds in the above described relationship. This may causes a burr at the butt portion between the first and second molds 16, 17, but the burring direction is coincident with the direction of movement of the brush 9. Therefore, if a burr is produced, it will not adversely affect the movement of the brush 9.

The molds described herein may be used with conventional resins according to conventional molding techniques to produce the brush holder structure of the present invention.

In the embodiment of the present invention thus arranged, the brush 9 accommodated in the brush holder 6 is pressed and held in slidable contact against the commutator 3b by the spring 10 fitted in place. With this structure of incorporating the spring 10 in the brush holder 6, it is not required to provide the conventional spring mount portion outside the brush holder 6, so that the brush holder structure can be compactly designed.

For realizing a structure incorporating the spring 10 in the brush holder 6 in the present invention, the brush holder 6 is integrally molded with the frame body section 4 with the consideration that the spring receiver 15 is disposed between the proximal end side wall 6a and the distal end side wall 6b so as to extend in the axial direction of the rotor shaft 3, and is set to have its width not exceeding the width of the lead-out groove 12 in the circumferential direction of the rotor shaft 3. This permits the desired molding only by forming the mold piece 16a for defining the lead-out groove 12 in the first mold 16 for forming the brush holder 6 in such a manner as to extend long enough to reach the inner surface of the distal end side wall with respect to the rotor shaft and define the corresponding portion of the same inner surface, and by forming the mold groove 17a in the second mold 17 so as to avoid an interference with the mold piece 16a with the groove bottom surface 17b positioned deeper than the surface of the mold piece 16a corresponding to the groove bottom of the lead-out groove 12. Accordingly, the spring receiver can be simply molded with the brush holder by setting the first and second molds 16, 17 in butt relationship against the main mold 20, without significantly complicating the arrangement necessary to form the spring receiver 15 in the brush holder 6.

The above structure provides another convenient advantage in that the stepped engagement portion 14 of the brush 9 and the spring offset restriction portion 19 can also be integrally formed by properly setting the molding surfaces of the first and second molds 16, 17.

In short, according to the present invention as described above, the spring receivers are also molded with the brush holders to make the springs fitted in the brush holders while integrally molding the brush holders and the end bracket with the gear frame for housing and supporting the worm gear mechanism. This eliminates the necessity of forming the spring mount portions outside the brush holders as with the prior art, and ensures fabrication of the end bracket in more compact size.

Further, the spring receiver can be formed in the brush holder by simply modifying the first and second molds which are set in butt relationship against the main mold for forming the brush holder, i.e., just by forming the mold piece for defining the lead-out groove in the first mold in such a manner as to extend long enough to reach the inner surface of the distal end side wall with respect to the rotor shaft and define the corresponding portion of the same inner surface, and by forming the mold groove in the second mold so as to avoid an interference with the mold piece with groove bottom surface of the mold groove positioned deeper than the surface of the mold piece corresponding to the groove bottom of the lead-out groove. As a result, the spring receivers can be simply molded with the brush holders by setting the first and second molds in butt relationship against the main mold, without significantly complicating the arrangement necessary to form the spring receivers in the brush holders.

We claim:

1. A brush holder structure suitable for use in an electric motor in which an end bracket is integrally molded with a gear frame, the brush holder structure for housing at least one brush held in suitable contact with a commutator, the end bracket rotatably supporting a rotor shaft of the motor and the gear frame housing and supporting a worm gear mechanism which includes a worm formed around a distal end portion of the rotor shaft and a worm wheel held in mesh with the worm, the brush holder structure comprising a plurality of brush holders integrally molded with the molded end bracket, each brush holder of said plurality of brush holders comprising:
   (i) a proximal end side wall having a lead-out groove for leading out therethrough a pig tail, and
   (ii) a spring receiver for receiving a resilient means fitted in said each rush holder, said spring receiver being disposed between the proximal each side wall and a distal end side wall of said each brush holder and extending in a direction parallel to an axial direction of the rotor shaft, wherein
   said spring receiver has a width in a direction circumferential to the rotor shaft equal to or less than a width of the lead-out groove in the direction circumferential to the rotor shaft.

2. The brush holder structure of claim 1, further comprising:
   a brush housed in said each brush holder; and
   said resilient means for resiliently urging said brush against the commutator.

3. The brush holder of claim 2, wherein said resilient means comprises a spring disposed within said each brush holder.

* * * * *